Figure 1:
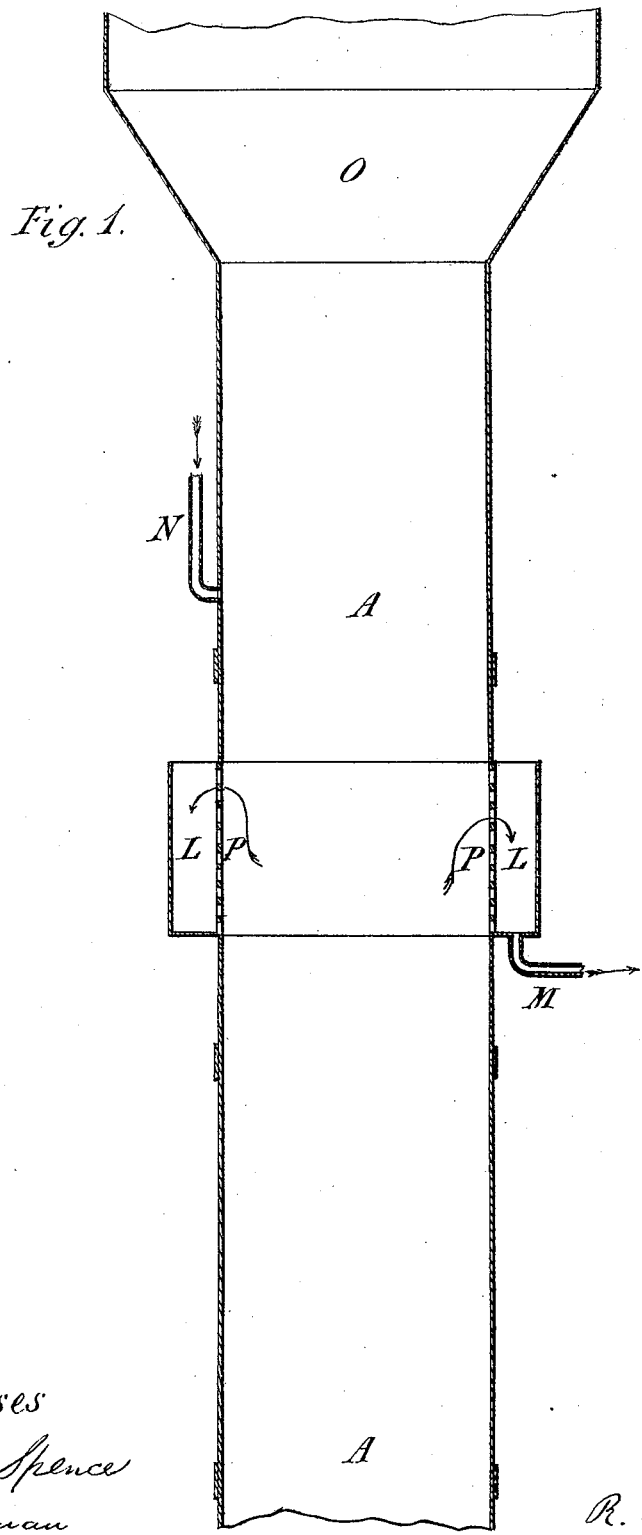

2 Sheets—Sheet 1.

R. G. ELWES.
FILTERS FOR THE DECOLORIZATION OF SUGAR IN SOLUTION.
No. 174,792. Patented March 14, 1876.

Witnesses
William Spence
Frank R Redman

Inventor
R. Gervese Elwes.

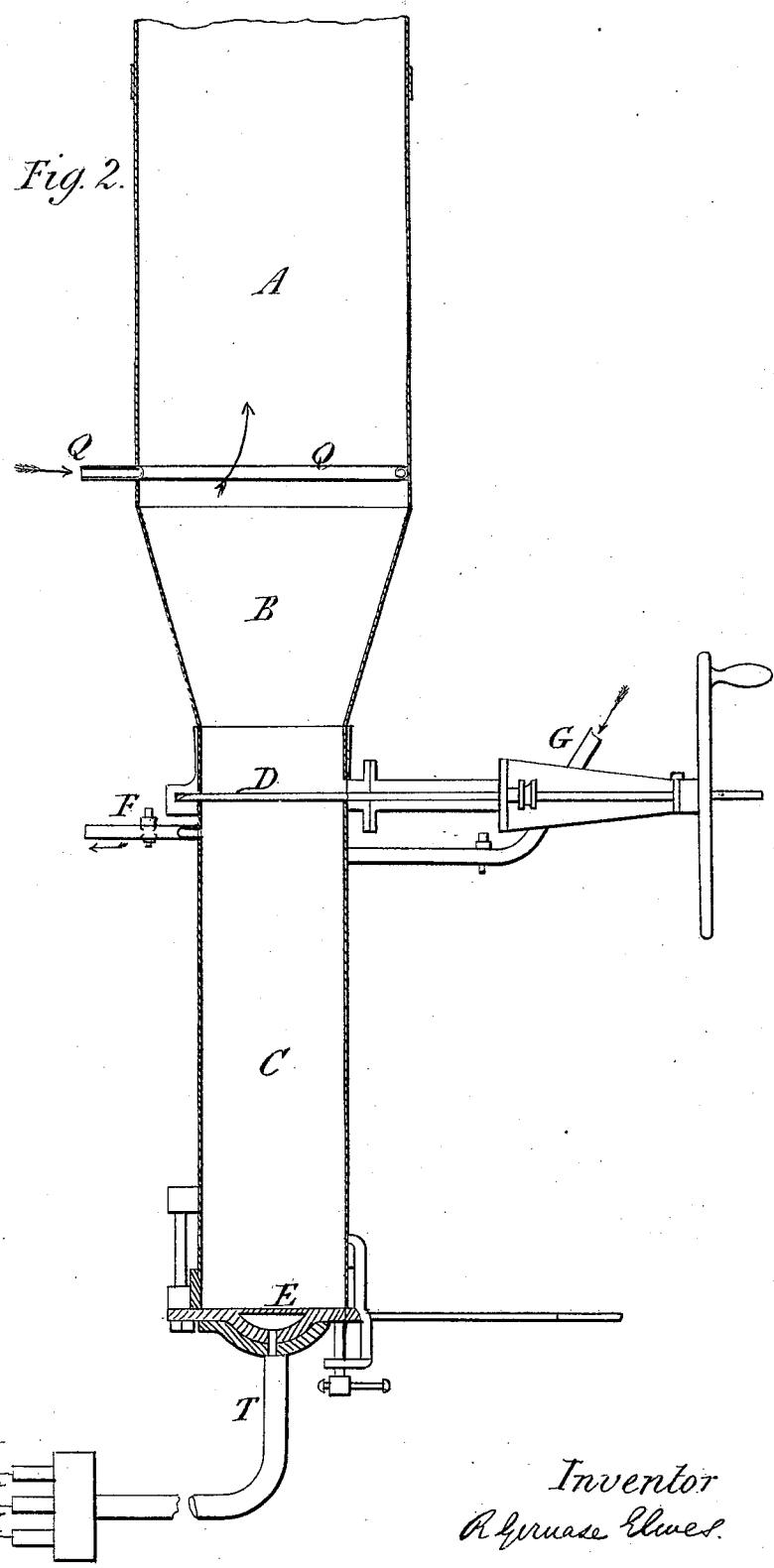

UNITED STATES PATENT OFFICE.

RICHARD GERVASE ELWES, OF WESTMINSTER, ENGLAND.

IMPROVEMENT IN FILTERS FOR THE DECOLORIZATION OF SUGAR IN SOLUTION.

Specification forming part of Letters Patent No. 174,792, dated March 14, 1876; application filed January 8, 1876.

*To all whom it may concern:*

Be it known that I, RICHARD GERVASE ELWES, of 7 Westminster Chambers, in the city of Westminster, England, civil engineer, have invented Improvements in Filters for the Decolorization of Sugar in Solution, and other Liquids, of which the following is a specification:

My invention relates to filters in which animal or other charcoal, or other filtering material, in powder or granules, is employed; and has for its object the construction and arrangement of filtering apparatus in such a manner as to combine the process of upward filtration with the means of admitting continuously, or from time to time, fresh charcoal or filtering material at or near the point of egress of the filtered liquid, and removing spent or exhausted charcoal or filtering material at or near the point of ingress.

The apparatus is so constructed that by the employment of upward filtration the most exhausted portion of charcoal—that is to say, the portion which is nearest to the point where the liquid to be filtered enters—may be continuously, or from time to time, removed, and fresh charcoal may be added at the part of the apparatus where the liquid escapes, so that the liquid may always be brought in contact with fresh charcoal before it leaves the filter.

The particular form of apparatus for removing the exhausted charcoal, or for supplying the fresh charcoal, may be varied; but I prefer to employ the arrangement hereinafter described, more especially when employed for the decolorization of sugar.

Figure 1 is a vertical section, showing the top of the apparatus; and Fig. 2 shows the bottom of the same, the intermediate part consisting of a cylinder between them, so as to form a continuous apparatus throughout its entire length.

A is a vertical vessel, of cylindrical or other suitable sectional form, having below it one or more conical or tapered prolongations, B, leading to one or more discharging-chambers, C, which may be of any convenient sectional form. At the upper end of the discharging-chamber C is a door or valve, D, and at the lower end of the same is a second door or valve or cover, E.

By means of the upper valve D a communication can be opened from the vessel A into the discharging-chamber C, and the lower valve or door E opens from the discharging-chamber C into the air.

F is an air-cock, fitted at the upper part of the discharging-chamber, for the admission and escape of air, as may be required. G is an inlet-pipe, for the admission of warm water to wash the exhausted charcoal as required. At the bottom of this chamber is a flexible exit-pipe, T, communicating with other pipes leading, respectively, to a sirup or juice tank, a sweet-water tank, and an outlet for waste-water, and indicated by the three arrows H I K. The entrance to the pipe T is protected by wire-gauze and filter-cloth, or other suitable means, to prevent the charcoal from passing into it.

The filtering-vessel A is fitted at the upper part with an enlarged portion, L, in which the filtered liquid may collect, and be drawn off by an exit-pipe, M. The filtering-vessel is also fitted with an inlet-pipe, N, for water with which to wash the whole contents of the filter when desired. O is a hopper at the top of the apparatus, through which the fresh charcoal is introduced as required. The lower end of this hopper is continuous with the sides of the filtering-vessel A, in which are formed apertures P within the enlarged portion L, such apertures being covered with wire-gauze and one or more thicknesses of filter-cloth, through which the filtered liquid can pass out into the enlarged portion L without any charcoal or dust passing out with it.

The liquid to be filtered is introduced at the lower part of the apparatus by means of a pipe, Q, terminating in a perforated pipe, which runs round the inside of the filtering-vessel; but any convenient form of inlet-pipe may be used. The pipe Q leads from a tank placed above the level of the point where the filtered liquid leaves the filtering-vessel, so as to obtain the pressure or head required to force the liquid up through the charcoal.

The method of working the apparatus is as follows: On the valve D at the top of the discharging-chamber C being closed, the filtering-vessel is filled with charcoal through the hopper O, and the liquid to be filtered is admitted, by the entering-pipe Q at the bottom of the said vessel, under a liquid pressure or head sufficient to force it up through the charcoal and out through the apertures P P into the enlarged portion or collecting-chamber L, whence it will flow away by the pipe M. As soon as the liquid ceases to run quite colorless the entry-pipe Q is closed, also the valve or door E at the bottom of the discharging-chamber C. The valve D at the top of this chamber is now opened, and the lowest portion of charcoal, which will be the foulest and most exhausted, is allowed to fall into the discharging-chamber C. As soon as the discharging-chamber is full the valve D is closed, the inlet-pipe Q is reopened, and the filtering process is resumed. In the meantime a fresh supply of charcoal has been introduced from the hopper O into the top of the filtering-vessel A, falling downward by gravity as the whole column of charcoal descends when the valve D is opened. The escaping liquid now comes in contact with this fresh charcoal and is completely decolorized, as before.

The exhausted charcoal removed from the filter contains a quantity of adhering liquid, which may be drained off from it while in the discharging-chamber by the pipe T, and pumped up again to the tank, whence the filtering-vessel is supplied.

In the case of sugar, the sirup or juice is first drained off by a pipe (indicated by the arrow H) leading to the sirup or juice tank. The charcoal is then washed with warm water, admitted through the pipe G, the resulting sweet water being led away to the sweet-water tank by the pipe indicated by the arrow I. When all the sirup has been extracted the charcoal may be further washed, if desired, the foul water being led away to waste by the pipe indicated by the arrow K. The charcoal or other filtering material is finally removed from the discharging chamber by opening the valve or door E at the bottom of this chamber, and taken to be reburned or revivified in the usual manner, when required. On a cessation of operations the whole contents of the filter can be drained of sirup or juice, and washed by means of the pipes connected with the filtering-vessel and discharging-chamber.

The advantages resulting from the foregoing process are as follows: First, the filtering operation is continuous, or nearly so, instead of being only intermittent, whereby a smaller number of filters are required, and the process can be carried on day and night, if desired. Secondly, there is a saving in the quantity of charcoal or filtering material required to be kept on hand at one time. Thirdly, the full useful effect can be got out of each portion of charcoal before it is reburned, whereas under existing systems much of the charcoal, when removed from the filters, is only partially exhausted. In this manner a saving is effected in the cost and waste of reburning. And, lastly, the whole of the liquid filtered can be as completely decolorized as the first portion, whereas under existing systems of intermittent filtration the last portion of liquid passed through the filter leaves it in a more highly-colored state than the first portion.

I claim—

The filtering-vessel A, with its enlarged portion L and the discharging-chamber C, in combination with the pipes Q, M, and T, and the valves D and E, substantially as described.

R. GERVASE ELWES.

Witnesses:
WILLIAM SPENCE,
ALFRED H. JONES.